United States Patent
Degtiarev et al.

(10) Patent No.: US 12,423,896 B1
(45) Date of Patent: Sep. 23, 2025

(54) AI-DRIVEN SMOOTH VIDEO-TO-VIDEO GENERATION

(71) Applicant: Glam Labs, Inc., San Francisco, CA (US)

(72) Inventors: Roman Degtiarev, Tbilisi (GE); Tikhon Vorobev, Saint Petersburg (RU)

(73) Assignee: Glam Labs, Inc., San Francisco, CA (US)

( * ) Notice: Subject to any disclaimer, the term of this patent is extended or adjusted under 35 U.S.C. 154(b) by 54 days.

(21) Appl. No.: 18/944,029

(22) Filed: Nov. 12, 2024

Related U.S. Application Data (63) Continuation-in-part of application No. 18/748,397, filed on Jun. 20, 2024, now Pat. No. 12,211,180.

(51) Int. Cl.
*G06T 13/00* (2011.01)
*G06T 5/60* (2024.01)
*G06T 5/70* (2024.01)

(52) U.S. Cl.
CPC .............. *G06T 13/00* (2013.01); *G06T 5/60* (2024.01); *G06T 5/70* (2024.01); *G06T 2207/20084* (2013.01)

(58) Field of Classification Search
CPC .. G06T 13/00; G06T 5/60; G06T 5/70; G06T 2207/20084
See application file for complete search history.

(56) References Cited

U.S. PATENT DOCUMENTS

| | | | |
|---|---|---|---|
| 7,944,449 B2 * | 5/2011 | Petrovic | G06T 13/40 345/473 |
| 11,922,550 B1 * | 3/2024 | Ramesh | G06F 40/284 |
| 2024/0087179 A1 * | 3/2024 | Min | G06T 11/00 |
| 2024/0371164 A1 * | 11/2024 | Yan | G06V 10/82 |

FOREIGN PATENT DOCUMENTS

CN 116977509 A * 10/2023 ............. G06T 13/40

* cited by examiner

*Primary Examiner* — Devona E Faulk
*Assistant Examiner* — Donna J. Ricks
(74) *Attorney, Agent, or Firm* — Georgiy L. Khayet (57) ABSTRACT

Provided are systems and methods for artificial intelligence (AI)-driven smooth video-to-video generation. An example method includes receiving a first video including first frames; acquiring a text including instructions for transforming the first video; encoding the text into text embeddings corresponding to the first frames; encoding the first frames into image latents; generating initial noise vectors and adding the initial noise vectors to the image latents to obtain noisy image latents; providing the text to a pretrained motion model to generate animation parameters corresponding to the first frames; providing the noisy image latents, the text embeddings, and the animation parameters to a neural network to generate second noise vectors for the image latents; removing the second noise vectors from the noisy image latents to obtain denoised image latents; and decoding the denoised image latents into second frames of a second video.

18 Claims, 9 Drawing Sheets

Frame 604

Frame 606

Frame 608

Frame 610

Frame 612

Frame 614

Frame 616

Frame 618

Frame 620

AI-DRIVEN SMOOTH VIDEO-TO-VIDEO GENERATION

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for artificial intelligence (AI)-driven smooth video-to-video generation.

BACKGROUND

AI-based video generation and transformation technologies have become widespread and are now integrated into many modern applications across various domains. In video chats, AI can enhance or alter live video feeds in real time. In social networks, AI-driven filters and effects can modify user-generated content. In online media, video editing and content creation can leverage the power of AI to generate or transform visual content.

However, despite significant advancements in AI-based video generation, appearance of unwanted artifacts during video generation or transformation processes remains a critical issue that results in diminished video quality and coherence. One particularly problematic artifact is the lack of motion coherency in the generated videos. As a result, movements across frames of videos may appear erratic and unnatural. Such motion inconsistencies in a video may break the natural flow, leading to the loss of immersion for viewers and reducing the perceived quality of the video.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for AI-driven smooth video-to-video generation is provided. An example method includes receiving a first video including first frames and acquiring a text including at least one instruction for transforming the first video. The method includes encoding the text into text embeddings corresponding to the first frames and encoding the first frames into latent representations (also referred to as image latents). The method includes randomly generating initial noise vectors for the image latents, adding the initial noise vectors to the image latents to obtain noisy image latents, and providing the text to a pretrained motion model to generate animation parameters corresponding to the first frames. The method includes providing the noisy image latents, the text embeddings, and the animation parameters to a first neural network to generate second noise vectors for the image latents. The method includes removing the second noise vectors from the noisy image latents to obtain denoised image latents and decoding, using a second neural network, the denoised image latents into second frames. The method includes generating, based on the second frames, a second video.

The operations of generation of the second noise vectors and removing the second noise vectors from denoised image latents can be repeated a predetermined number of times until the denoised image latents converge to further image latents associated with a true data distribution for latents corresponding to images. The first neural network includes a U-net architecture.

The animation parameters derived from the motion model ensure temporal consistency by guiding the intermediate features during the denoising process, thereby maintaining smooth and coherent motion across adjacent frames. The animation parameters also guide the denoising process across the iterations to ensure smooth transitions between frames.

The animation parameters are derived from motion priors learned from video datasets. The motion priors ensure temporal consistency and guide intermediate features generated by the first neural network during the generation of the second noise vectors. The motion model learns generalized motion patterns from video data, allowing it to be applied across various animation scenarios without the need for specific tuning. The animation parameters may include information concerning positions and actions of objects or characters across the frames. The motion model ensures that the difference in the positions of an object in adjacent second frames is less than a predetermined threshold, thereby maintaining smooth and natural motion throughout the second video generated based on the second frames. The animation parameters may also ensure that an action associated with at least one character does not change across the second frames. The action may include one or more of the following: running, jumping, dancing, and playing a musical instrument. The motion model can be further adapted to specific motion patterns using a lightweight fine-tuning process. By incorporating techniques such as low-rank adaptation (LoRA), the model can refine its motion dynamics to handle complex camera effects like zooming, panning, or other environmental shifts. This adaptation ensures generation of realistic and smooth animations with minimal retraining, allowing for flexible adjustment to new motion scenarios without the need for extensive data collection. The motion model can function as a plug-and-play component, allowing it to be seamlessly integrated into various personalized text-to-video models without requiring model-specific tuning.

According to another embodiment, a system for AI-driven smooth video-to-video generation is provided. The system may include at least one processor and a memory storing processor-executable codes, wherein the processor can be configured to implement the operations of the above-mentioned method for AI-driven smooth video-to-video generation.

According to yet another aspect of the disclosure, there is provided a non-transitory processor-readable medium, which stores processor-readable instructions. When the processor-readable instructions are executed by a processor, they cause the processor to implement the above-mentioned method for AI-driven smooth video-to-video generation.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes methods and systems for AI-driven smooth video-to-video generation. In some embodiments, a system receives a video and a text providing instructions for transformation of the video. The instructions may include descriptions of movements of objects and characters in the video. The system then uses a classifier to extract features from the frames of the video and update features in the text to generate expanded texts for each frame. These features can be associated with specific characteristics of an object, person, or animal present in the frames. The system then uses a latent diffusion algorithm to apply stylization to the frames, leaving the rest of the frame unchanged. Prior to applying the diffusion algorithm, the updated texts are encoded into text embeddings (e.g., using Contrastive Language-Image Pre-Training (CLIP)), and the frames are encoded into frame latents (e.g., using Variational Autoencoders Encoder (VAE). Random Gaussian noises (initial noise vectors) are added to the frame latents to obtain noisy frame latents. These noisy frame latents are then combined with the text embeddings to form composite embeddings. All composite embeddings can be simultaneously provided to a U-Net architecture based neural network. The U-net neural network can predict second noise vectors, which are subtracted from the initial noise vectors to refine the frame latents. This process is iterated multiple times for further refinement of the frame latents. Finally, the refined frame latents are decoded (e.g., using a Variational Autoencoder (VAE)) to produce frames of a transformed video. The transformed video is the input video stylized according to the instructions in the text.

Existing solutions may generate videos lacking coherency in motions, which results in reducing the perceived quality of the video. Embodiments of the present disclosure may resolve this issue by introducing a motion module that utilizes a pre-trained model to predict animation parameters based on instructions. The animation parameters may include information concerning motions of objects and characters in the video. During the iteration process of refining video frame latents, the motion module may use the animation parameters to modify internal features generated by a U-net neural network. This may ensure that the animation in the frames aligns with the instructions and that movements of objects and characters are smooth and consistent across the frames.

Furthermore, existing solutions often generate stylized videos having unwanted artifacts created during generation of the videos. These artifacts may include apparent changes in ethnicity, age, or gender, as well as misplacement of facial features. The existing solutions may also cause incorrect spatial orientation; for example, a person may face away from the camera instead of facing the camera and vice versa. Embodiments of the present disclosure mitigate these drawbacks using adaptive video styling that considers the presence and position of the objects in the frames.

The solution disclosed herein may allow modifying text instructions prior to encoding the text instructions into text embeddings by a neural network such as, for example, a CLIP neural network. The CLIP is an AI model designed to understand images and text jointly. The CLIP can recognize and describe visual content based on textual queries and vice versa. Before the text instructions are received by the CLIP, the text instructions can be processed by a text tokenizer. The modifications made by the text tokenizer ensure that the ethnicity, gender, age, and pose (e.g., whether a person faces the camera) are taken into account. To obtain the information needed to make these modifications, detectors and classifiers can be used to determine a person's ethnicity, gender, and age. The detectors and classifiers may include one or more neural networks trained to analyze the frame in order to determine the person's ethnicity, gender, and age. A pose estimator, such as, for example, DensePose, can be employed to predict the person's position in the frame, which helps to maintain spatial accuracy in the final stylized video.

Figure 1:
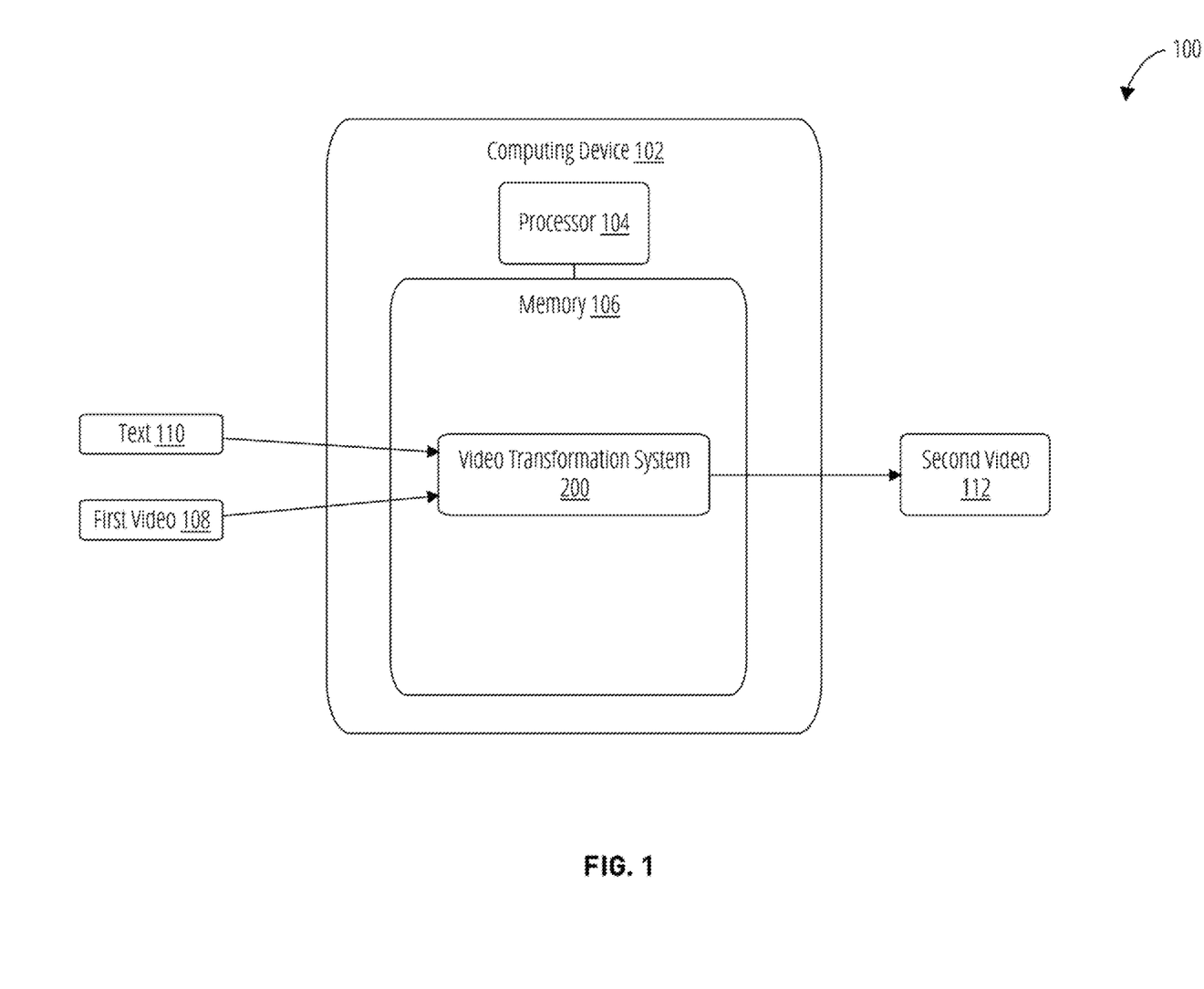
FIG. 1 shows an example environment, in which system and methods for AI-driven smooth video-to-video generation can be implemented.

Referring now to the drawings, FIG. 1 shows an example environment 100, in which system and methods for AI-driven smooth video-to-video generation can be implemented. Environment 100 may include a computing device 102 including a processor 104 and a memory 106. Memory 106 may store, as processor-executable instructions, a video transformation system 200.

Computing device 102 may include, but is not limited to, a notebook computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

The video transformation system 200 can receive a first video 108 and a text 110. The text 110 may include instructions on how to transform and stylize first video 108. Video transformation system 200 may generate second video 112 based on first video 108 and text 110. In various embodiments, the instructions in text 110 may include, for example, "generate image in anime style," "add snow to the background," "do not modify the background," and so forth. First video 108 and text 110 can be provided by a user of computing device 102 via a user interface. Details of video transformation system 200 are described in FIG. 2.

Figure 2:
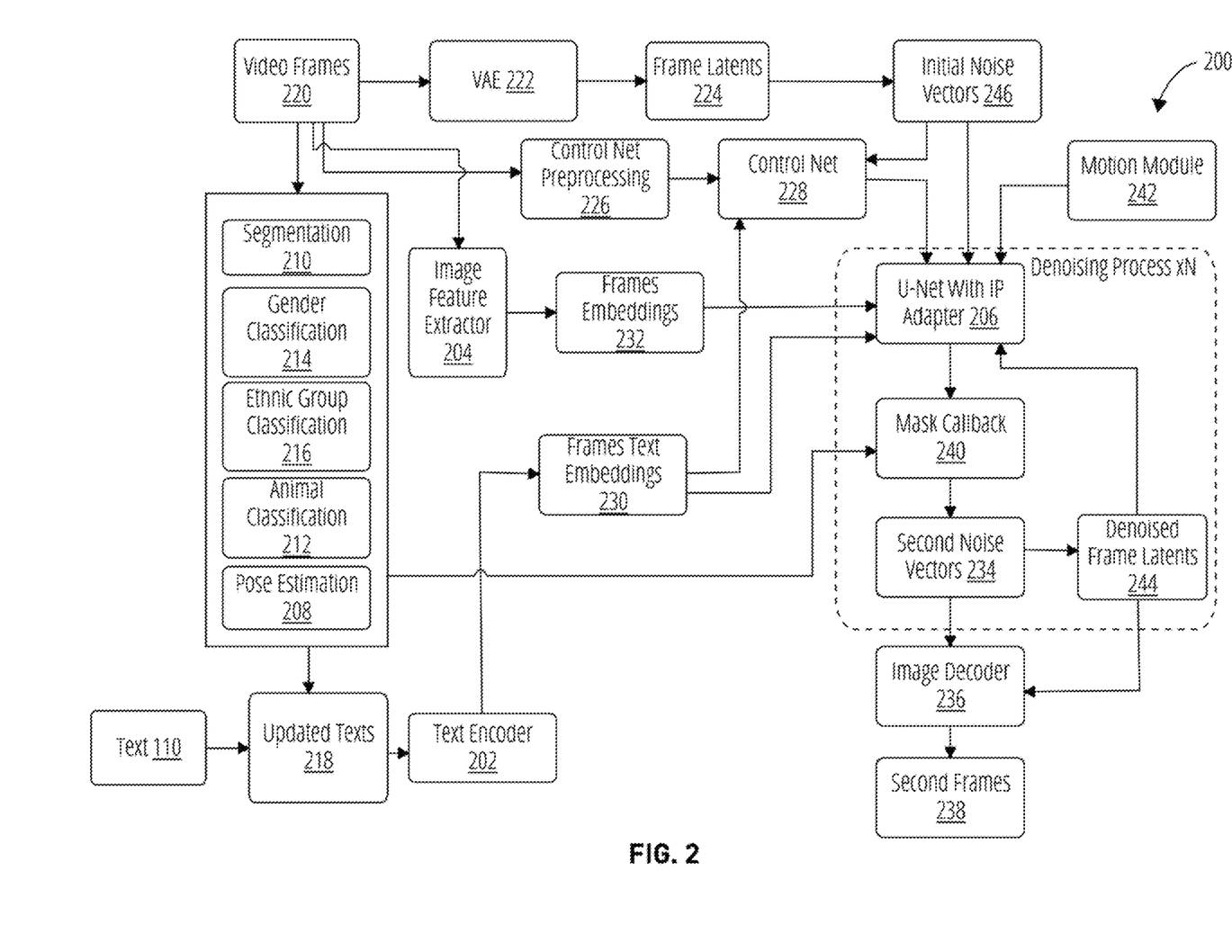
FIG. 2 a block diagram showing modules of video transformation system, according to some example embodiments.

FIG. 2 is a block diagram showing modules of video transformation system 200, according to some example embodiments. The video transformation system 200 may include a VAE 222, an image feature extractor (e.g., CLIP) 204, a text encoder (e.g., CLIP) 202, a segmentation 210, a gender classification 214, an ethnic group classification 216, an animal classification 212, a pose estimation 208, a control net preprocessing 226, a control net 228, a U-net with Input Processing (IP) adapter 206, a mask callback 240, a motion module 242, and an image decoder 236. In other embodiments, video transformation system 200 may include fewer or more modules than shown in FIG. 2.

Video transformation system 200 may process video frames 220 of first video 108 simultaneously as a whole. Specifically, VAE 222 may receive video frames 220 in one of computer readable formats and encode video frames 220 into frame latents 224 (also referred to as latent vectors) such that each of the frame latents 224 corresponds to a video frame of first video 108. The frame latents 224 may refer to a numerical representation of video frames 220 in a vector space associated with a diffusion model.

Image feature extractor 204 may receive video frames 220 in one of computer readable formats and encode video frames 220 into frames embeddings 232. The frames embeddings 232 may refer to a compressed, continuous, and typically lower-dimensional representation of video frames 220 in a latent space. In some embodiments, image feature extractor 204 can be a convolutional neural network (CNN), for example CLIP, or other type of network designed to extract meaningful features from images.

Segmentation 210 may analyze video frames 220 to determine portions within each of video frames 220. The portions can be provided to mask callback 240 to generate masks for the portions. The masks may include a mask for the body of a person in video frames 220, a mask of background in video frames 220, a mask for hair region of the person in video frames 220, and so forth.

Gender classification 214 may analyze video frames 220 to determine the gender of a person present in video frames 220. Ethnic group classification 216 may analyze video frames 220 to determine an ethnic group of the person. Pose estimation 208 (such as DensePose) may predict poses of the person in each of video frames 220, for example, whether the person is facing away or facing the camera. Video transformation system 200 may further include one or more models for detecting further features of the person present in video frames 220, such as age, hairstyle, and so forth. Animal classification 212 may analyze video frames 220 to determine a type and/or a breed of an animal present in video frames 220. In various embodiments, segmentation 210, gender classification 214, ethnic group classification 216, animal classification 212, and pose estimation 208 can be implemented as pretrained neural networks.

The features determined by gender classification 214, ethnic group classification 216, animal classification 212, and pose estimation 208 can be used to generate updated texts 218. An updated text from the updated texts 218 includes text 110 updated based on features determined by modules 208, 212, 216, and 214 for a video frame from video frames 220. The example features added to the text 110 may include "an African young woman facing the camera," "a Caucasian man facing away from the camera," "a girl raising her right hand," and so forth. For example, if original text 110 includes "woman portrayed in an anime style" and ethnic group classification 216 determines that the video frame includes an African woman, then the text 110 can be modified to "an African woman in anime style.". Updated texts 218 can be provided to text encoder 202.

Text encoder 202 may transform the updated texts 218 to frames text embeddings 230. The frames text embeddings 230 may refer to a numerical representation of a text in a latent space. The latent space of frames text embeddings 230 is aligned with the latent space of frames embeddings 232 generated by the image feature extractor 204. The text encoder 202 can be CLIP or other networks designed to transform the text into text embeddings.

Control net preprocessing 226 may analyze video frames 220 to determine an additional input for control net 228. The additional input may include sketches, outlines, edge maps, key points, and other features in the video frames 220. Control net 228 can generate, based on frames text embeddings 230 and the additional input, control vectors in an internal format readable by U-net with IP adapter 206.

Video transformation system 200 can generate initial noise vectors 246 for the frame latents 224. The size of an initial noise vector from initial noise vectors 246 can be the same as the size of a corresponding frame latent from frame latents 224. These initial noise vectors 246 typically consist of randomly generated Gaussian noise for specific portions of frame latents 224 that correspond to a section of video frames 220. The initial noise vectors 246 can be injected into the frame latents 224 to obtain noisy frame latents. The noisy frame latents are processed by U-net with IP adapter 206.

U-net with IP adapter 206 may include a U-net and an IP Adapter. U-net may include cross-attention layers to integrate the frames text embeddings 230, frames embeddings 232, and control vector generated by control net 228. U-net is trained to predict second noise vectors 234. These second noise vectors 234 represent the difference between the noisy frame latents and the denoised approximation that aligns with the true data distribution of image latents. This true data distribution approximates the probability distribution of clean image latents derived from a set of sample images. IP Adapter can be an additional module or component that modifies how the input data is processed before being fed to the U-net. Combining a U-Net with an IP Adapter allows incorporating additional inputs and control mechanisms to enhance the image processing capabilities of the U-Net. The IP Adapter can process the frames embeddings 232 to extract useful information or modify the frames embeddings 232 to ensure that the U-Net generates correct output.

Mask callback 240 can generate masks defining how different parts of video frames 220 are processed. Specifically, mask callback 240 creates masks that define to what extent to process and change different parts of video frames 220 (for example, faces, facial features, foreground, and background). Accordingly in some embodiments, video transformation system 200 can generate different initial noise vectors 246 (and correspondingly, second noise vectors 234) for various portions of video frames 220, allowing specific regions to be modified differently. This targeted approach ensures that some areas of video frames 220 are altered less or more than others, enabling the application of different styles to specific sections based, for example, on the prompts provided in text 110. The initial noise vectors 246 can be injected only into the parts of frame latents 224 that correspond to regions of video frames 220 defined by the masks.

Video transformation system 200 may utilize second noise vectors 234 to obtain denoised frame latents 244 by applying a linear transformation to the noisy image latents. The denoised frame latents 244 can then be processed by U-net with IP adapter 206 to update second noise vectors 234, which in turn can be used to update the denoised frame latents 244. This iterative process of predicting second noise vectors 234 and updating denoised frame latents 244 can be repeated several times (e.g., five) until the denoised frame latents 244 converge to an image latent belonging to the true data distribution of embedding corresponding to images. Thus, the iterative process progressively aligns the denoised frame latents 244 with the desired data distribution and achieves high-quality stylization.

After the iterative denoising steps, the denoised frame latents 244 can be provided to image decoder 236. The image decoder 236, which may include a VAE decoder, processes the refined denoised frame latents 244 to reconstruct second frames 238 that align with the stylistic instructions provided in text 110 while preserving the key features of the original image. Video transformation system 200 can then generate second video 112 (shown in FIG. 1) based on second frames 238.

During the iterative process, motion module 242 ensures that the motion of objects and characters in the video appears natural and coherent over time, which is across the denoised frame latents 244 corresponding to video frames 220. The motion module 242 can include a pretrained model (e.g., a pretrained neural network) to predict and generate animations across video frames 220. Specifically, motion module 242 may generate animation parameters based on instructions provided by a user in text 110 and use the animation parameters to modify intermediate features generated by U-net with IP adapter 206 during generation of second noise vectors 234. This may ensure that the animations align with the instructions in text 110. Example instructions may reflect the desired actions and movements to be presented in second video 112 (shown in FIG. 1). Example instructions may include, "panda playing a guitar, on a boat, in the ocean,", "a cat riding a bicycle through a field of sunflowers," "elephant painting a canvas in the middle of a bustling city," "a lion wearing sunglasses while surfing on a tropical wave," "a penguin dancing in a rainstorm under a colorful umbrella," "a koala flying a kite on a mountaintop at sunset," and the like. Motion module 242 may include one or more pre-learned motion patterns for different types of movements and activities.

Animation parameters may include a variety of details that guide how objects or characters move and behave within an animation sequence. These parameters may include information about changing the pose of an object across the second frames 238, which refers to adjustments in the orientation or posture of the object as it transitions from one frame to the next. Additionally, the animation parameters may include information about the positions of the object across the second frames, ensuring that its spatial location is correctly tracked and updated as the animation progresses. Furthermore, animation parameters may include details concerning an action performed by a character across the second frames 238, ensuring that the specific movement or behavior of the character—whether subtle or dynamic—is appropriately represented over time. The action can include movements such as gestures, body shifts, or complex sequences of actions that involve multiple parts of the body.

The animation parameters can be derived from motion priors learned from video datasets. Motion priors can be referred to as a set of patterns or learned behaviors established from analyzing large amounts of real-world video data. These motion priors encode typical or expected movements that occur over time, such as how humans walk, run, or perform various tasks. By learning from the video datasets, the motion module can be trained to produce animation parameters corresponding to natural, smooth motion sequences and how they evolve from frame to frame. This can allow the motion module to make predictions about how objects or characters should move in new, unseen animations. For example, if the motion module has learned motion priors related to walking, it can understand how each part of the body (e.g., legs, arms, torso, and head) should move in relation to one another over time.

By applying the animation parameters to intermediate features generated by the U-Net with IP adapter 206, a high level of control can be maintained over the animation sequence. This integration may help to ensure that the actions associated with a character or person appearing in the video frames 220 remain consistent and coherent across the second frames 238. In other words, actions like running, jumping, dancing, or playing a musical instrument are faithfully preserved and do not fluctuate or degrade as the animation progresses through each frame.

Applying animation parameters to intermediate features generated by U-net with IP adapter 206 may also ensure that a difference in positions of an object in adjacent second frames 238 is less than a predetermined threshold, thereby ensuring that the object changes predictably, without abrupt changes in direction or speed. This may ensure that second video 112 generated based on second frames 238 does not include inconsistencies in motion to which human vision can be sensitive.

In some embodiments, the motion module can be further adapted to specific motion patterns through a lightweight fine-tuning process. By incorporating techniques such as low-rank adaptation (LoRA), the motion module can refine its understanding of motion dynamics to handle more complex camera effects, such as zooming, panning, or other environmental changes like shifts in lighting or background. This adaptation may allow the motion module to account for the interactions between objects and the camera, ensuring that movements remain realistic and smooth, even in the presence of dynamic camera angles or scene alterations.

The use of such efficient fine-tuning methods may ensure that the motion module can generate natural-looking animations with minimal retraining, offering significant flexibility when adjusting to new motion scenarios. This process reduces the need for extensive new data collection or full model retraining, making it particularly valuable for applications where time and resources are limited. Additionally, the motion module can operate as a plug-and-play component, allowing it to be easily integrated into various personalized text-to-video models.

Figure 3:
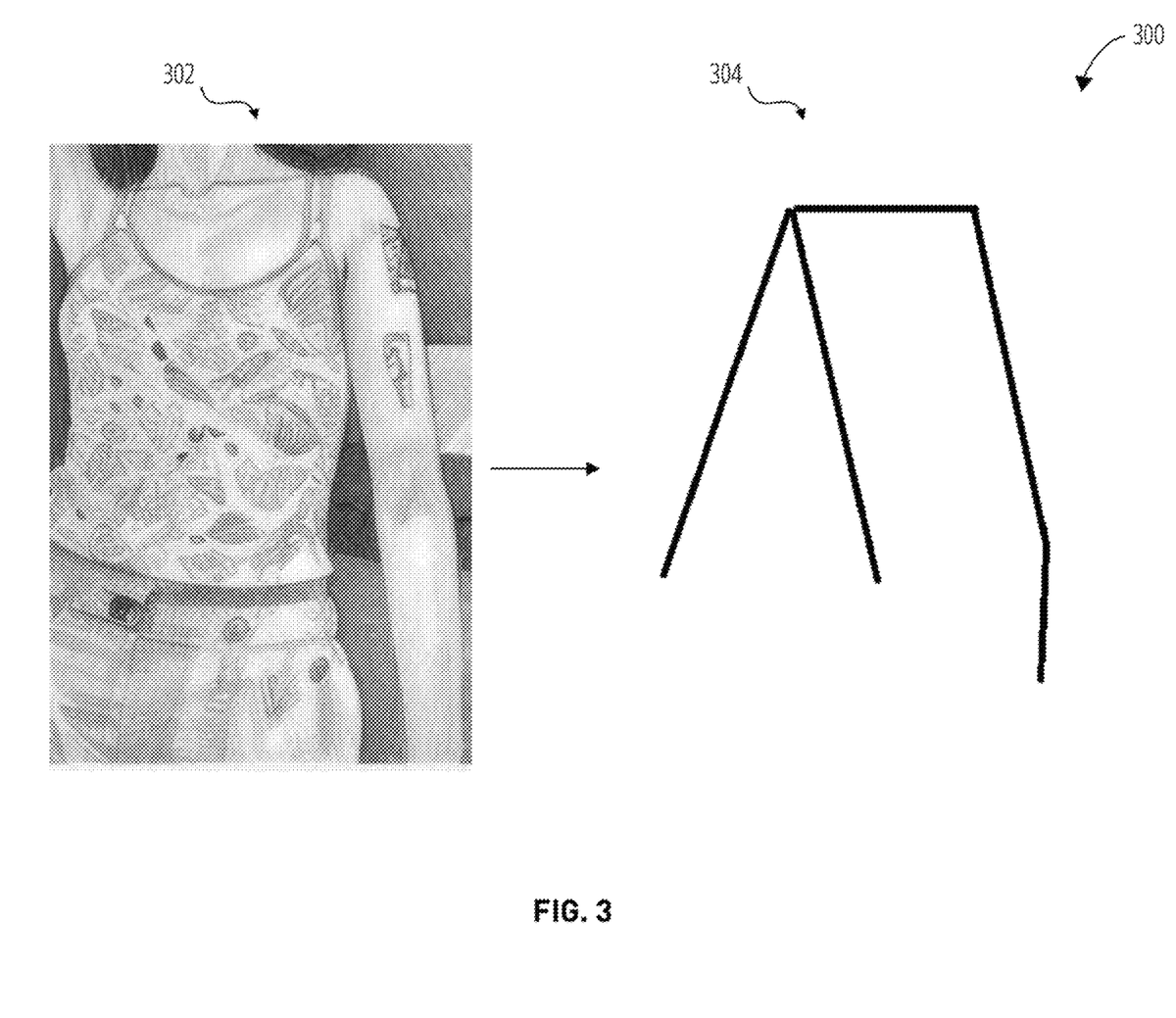
FIG. 3 is a schematic showing an example frame and an image of a skeleton corresponding to a person present in the frame.

FIG. 3 is a schematic 300 showing an example frame 302 and an image of skeleton 304 corresponding to a person present in frame 302. Pose estimation 208 (shown in FIG. 2) may include a neural network that generates skeleton 304 from frame 302. Points in skeleton 304 can be assigned colors indicating coordinates of the points in a horizontal direction from the point of view of the camera. In some embodiments, the skeleton 304 can be generated by a DensePose.

Pose estimation 208 may include a model that determines the pose of the person in frame 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if text 110 includes "woman in anime style," then the text 110 can be modified to "woman in anime style facing front."

Figure 4:
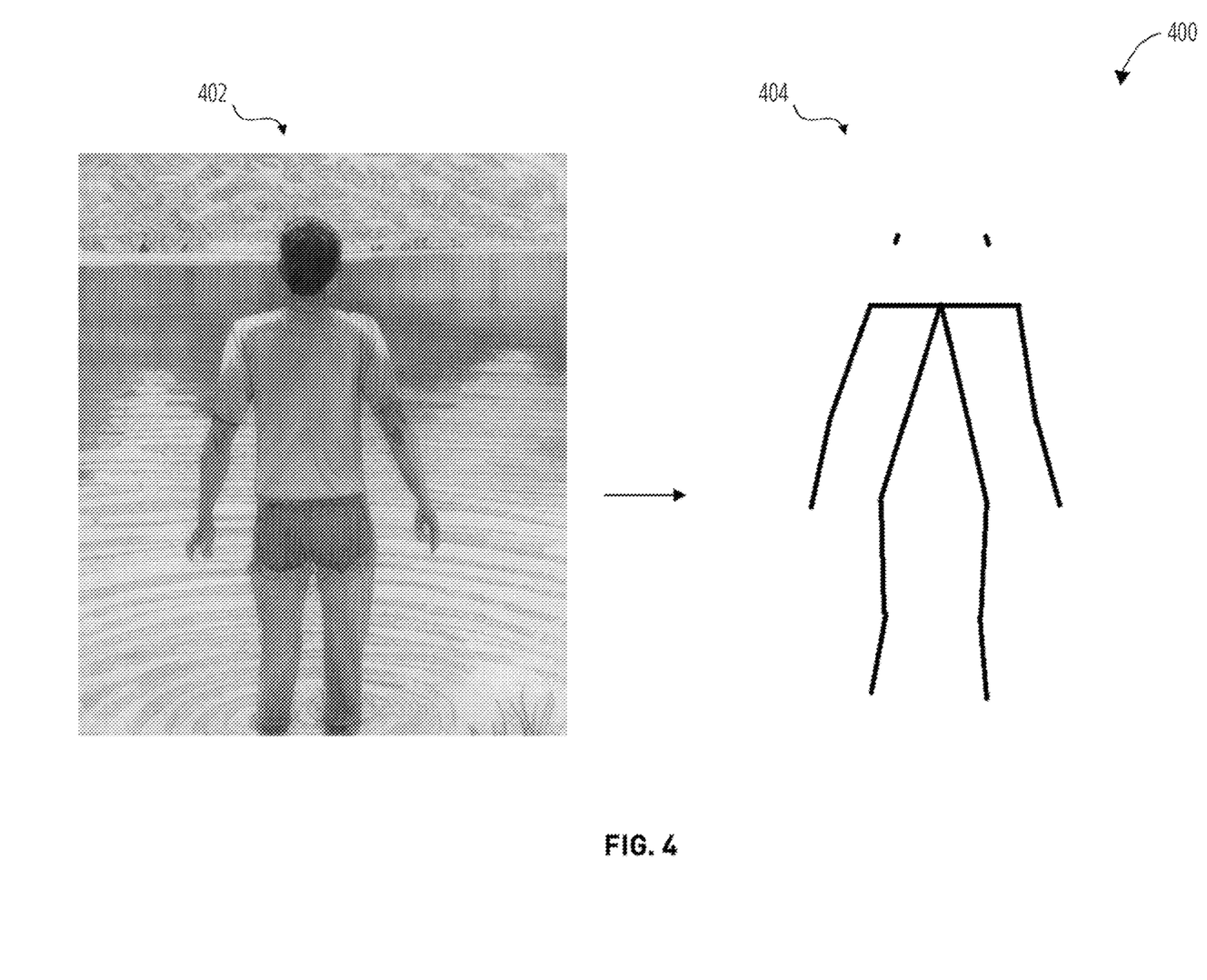
FIG. 4 is a schematic showing an example frame and an image of a skeleton corresponding to a person present in the frame.

FIG. 4 is a schematic 400 showing an example frame 402 and an image of a skeleton 404 corresponding to a person present in frame 402. In frame 402, a person is shown in full length. In corresponding skeleton 404, the left shoulder and the right shoulder have the same coordinate in the horizontal direction from the point of view of the camera. However, the coordinate of the right hip is smaller than the coordinate of the left hip. It means that the person is facing backwards. Accordingly, if text 110 includes "a man in anime style," then the text 110 can be modified to "body of a man in anime style viewed from behind."

Figure 5:
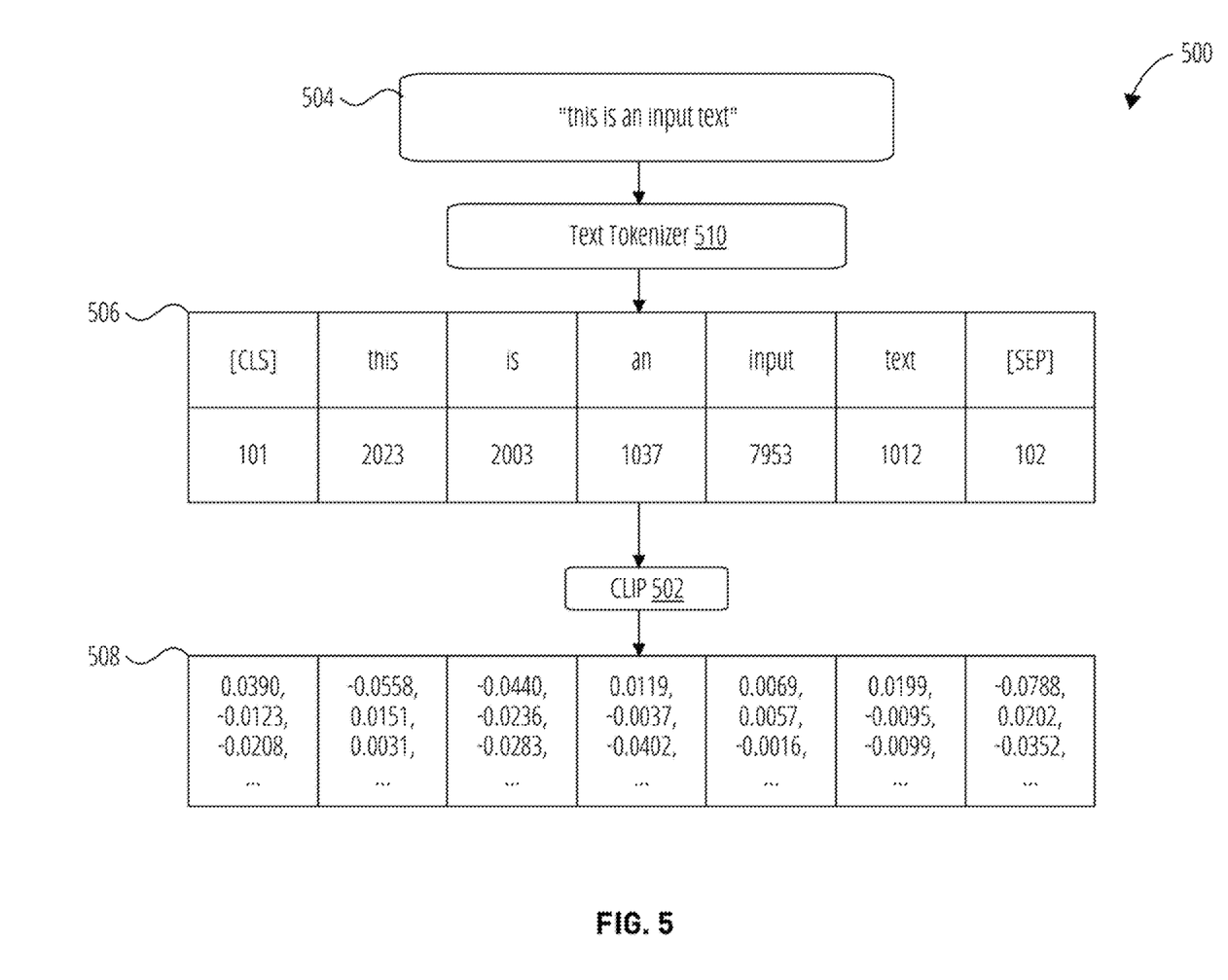
FIG. 5 is a block diagram showing details of converting text into text embeddings, according to an example embodiment.

FIG. 5 is a block diagram 500 showing details of converting text into text embeddings 508, according to an example embodiment. In the example of FIG. 5, CLIP 502 is used as text encoder 202 shown in FIG. 2. Text tokenizer 510 may generate text tokens 506 from raw text 504 (for example, text 110). Then text tokens 506 can be provided to CLIP 502 to generate text embeddings 508.

Figure 6A:
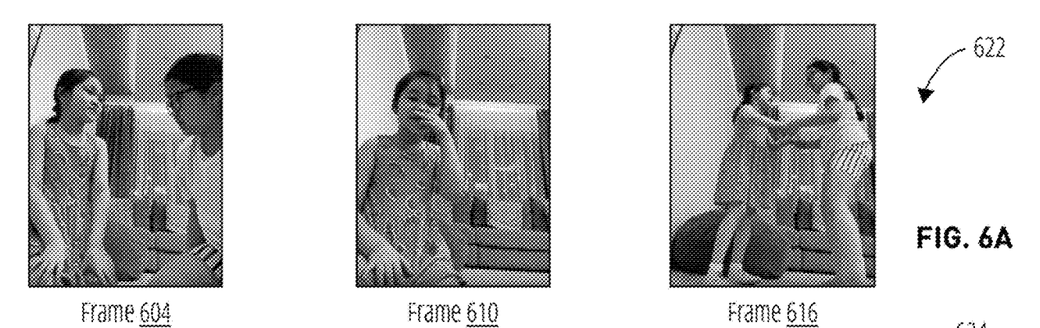
FIG. 6A shows frames of example video.

FIG. 6A shows frames 604, 610, and 616 of example first video 622. The first video 622 features two girls playing each other.

Figure 6B:
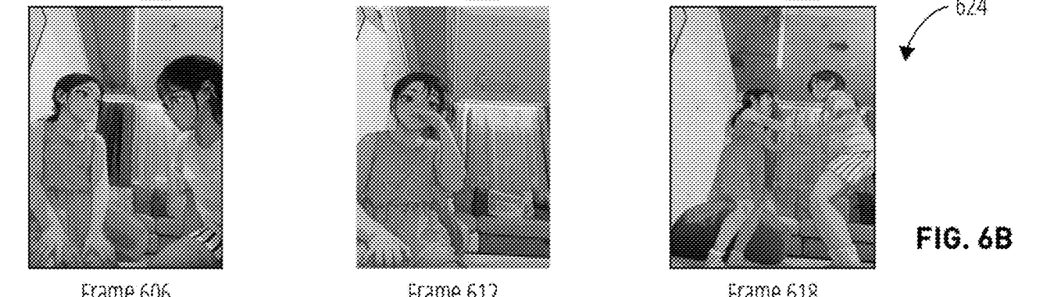
FIG. 6B shows frames of example video generated based on the video shown in FIG. 6A without applying animation parameters.

FIG. 6B shows frames 606, 612, and 618 of example second video 624 generated based on the first video 622 shown in FIG. 1 without applying animation parameters from motion module 242 (shown in FIG. 2). As a result, the movements of the girls in the second video 624 appear uneven and lack smoothness to the human vision.

Figure 6C:
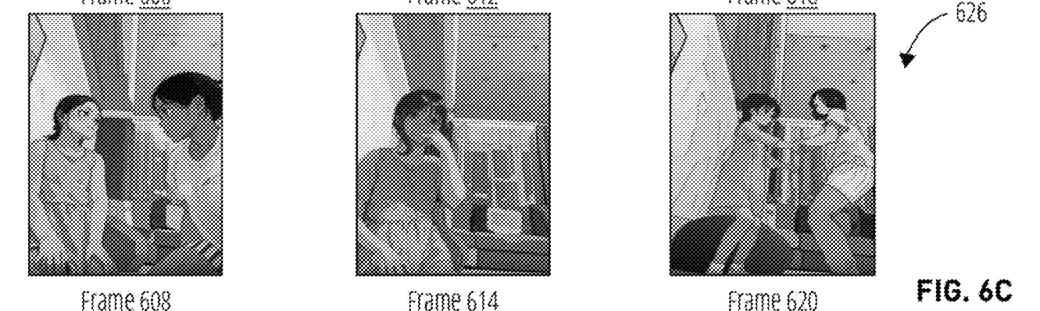
FIG. 6C shows frames of example video generated based on the video shown in FIG. 6A with applying animation parameters.

FIG. 6C shows frames 608, 614, and 620 of example second video 626 generated based on the first video 622 shown in FIG. 1 with applying animation parameters from motion module 242 (shown in FIG. 1). As a result, the movements of the girls in the second video 626 appear smooth and seamless to the human vision.

Figure 7:
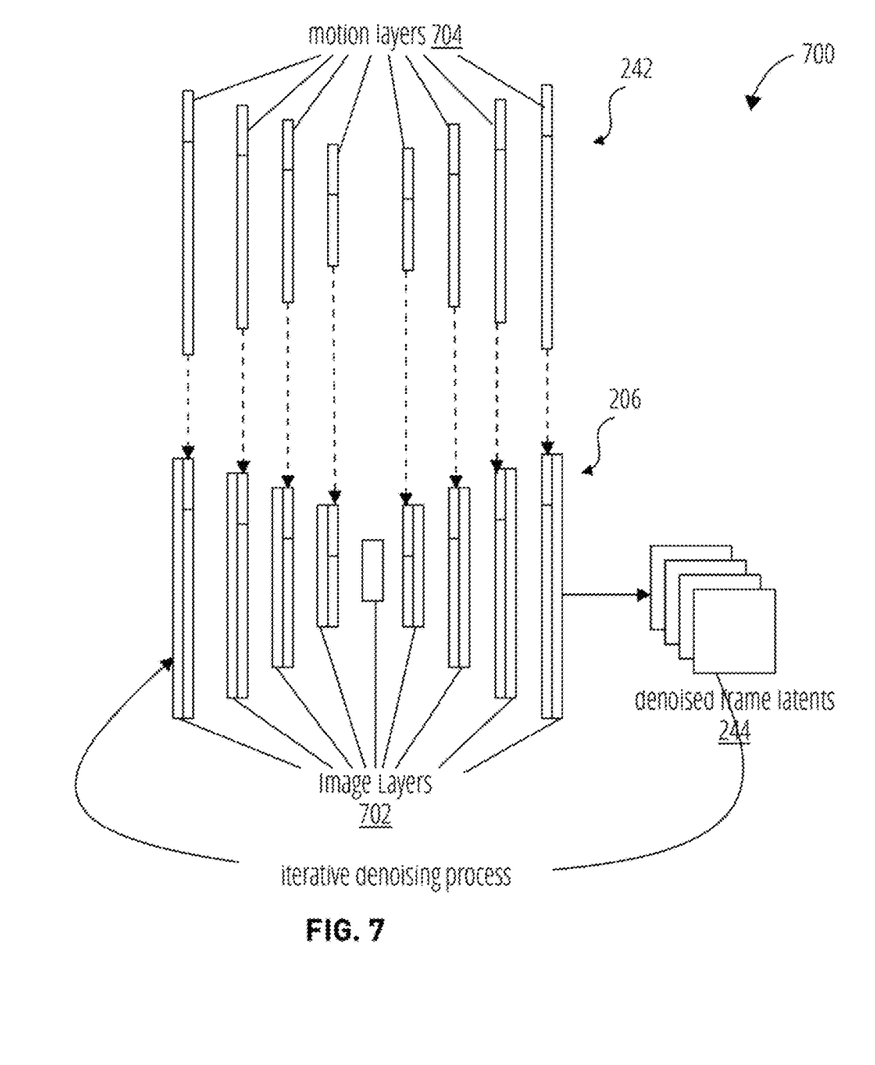
FIG. 7 is a flow chart showing method for AI-driven smooth video-to-video generation, according to some example embodiments.

FIG. 7 is a schematic 700 showing details of motion module 242 and U-net with IP adapter 206, according to an example embodiment. Motion module 242 may include motion layers 704. U-net with IP adapter 206 may include image layers 702 that generate features during an iterative denoising process of updating denoised frame latents 244. Motion module 242 may include motion layers 704. Motion layers 704 modify intermediate features generated by image layers 702 according to animation parameters. Animation parameters can be determined by a pretrained model based on instructions included in text 110 (as described in FIG. 2).

Figure 8:
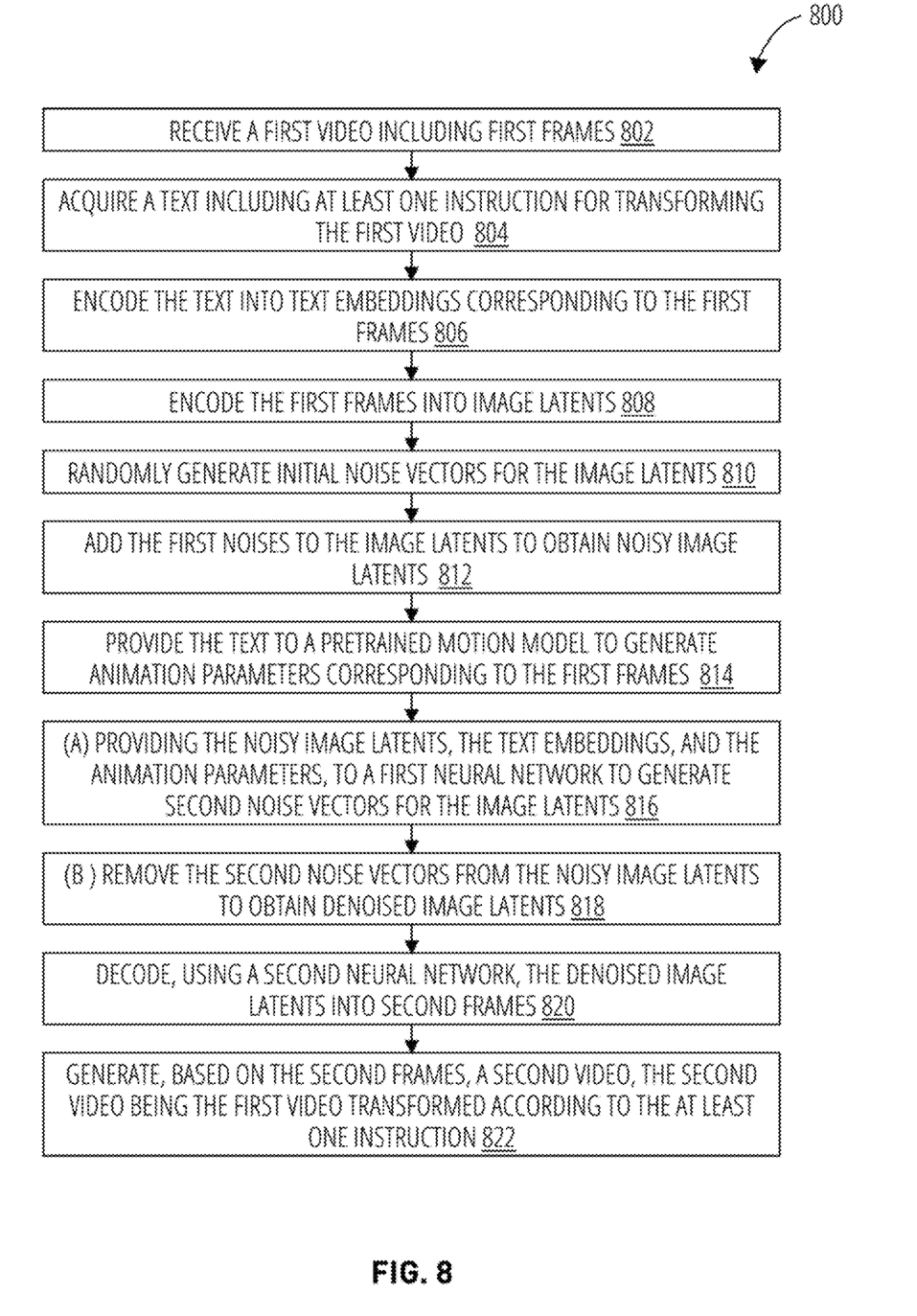
FIG. 8 is a flow chart showing method for AI driven video stylization with text description tuning, according to some example embodiments.

FIG. 8 is a flow chart showing method 800 for AI-driven smooth video-to-video generation, according to some example embodiments. Method 800 can be implemented by computing device 102 and video transformation system 200 shown in FIG. 1 and FIG. 2. In some embodiments, the operations of method 800 may be combined, performed in parallel, or performed in a different order. Method 800 may also include additional or fewer operations than those illustrated. Method 800 may be performed by processing logic that comprises hardware (e.g., decision making logic, dedicated logic, programmable logic, and microcode), software (such as software run on a general-purpose computer system or a dedicated machine), or a combination of both.

In block 802, method 800 may include receiving a first video including first frames. In block 804, method 800 may include acquiring a text. The text may include at least one instruction for transforming the first video. The text may also include description of a motion of an object or an action of a character to be presented in the transformed first video.

In block 806, method 800 may include encoding the text into text embeddings corresponding to the first frames. In block 808, method 800 may include encoding the first frames into image latents.

In block 810, method 800 may include randomly generating initial noise vectors for the image latents. The initial noise vectors may include Gaussian noise. In block 812, method 800 may include adding the initial noise vectors to the image latents to obtain noisy image latents. In block 814, method 800 may provide the text to a pretrained motion model to generate animation parameters corresponding to the first frames. The animation parameters may include information concerning positions of an object across the first frames. The animation parameters may include information concerning changing the pose of an object across the first frames.

In block 816, method 800 may include providing the noisy image latents, the text embeddings, and the animation parameters, to a first neural network to generate second noise vectors for the image latents. The animation parameters generated by the pretrained motion model can be used to modify intermediate features generated by the first neural network during the generation of the second noise vectors. The first neural network may include a U-net architecture.

In block 818, method 800 may include removing the second noise vectors from the noisy image latents to obtain denoised image latents. Method 800 may include repeating operations of block 816 and block 818 a predetermined number of times, starting with the denoised image latents and repeating until the denoised image latents converge to further image latents associated with a true data distribution for latents corresponding to images.

In block 820, method 800 may include decoding, using a second neural network, the denoised image latents into second frames. Using the animation parameters to modify the intermediate features generated by the first neural network may ensure that a difference in positions of an object in adjacent second frames is less than a predetermined threshold. Using the animation parameters to modify the intermediate features generated by the first neural network may also ensure that an action associated with at least one character does not change across the second frames. The action includes one or more of the following: running, jumping, dancing, and playing a musical instrument.

In block 822, method 800 may include generating, based on the second frames, a second video. The second video can be the first video transformed according to the instruction provided in received text.

Figure 9:
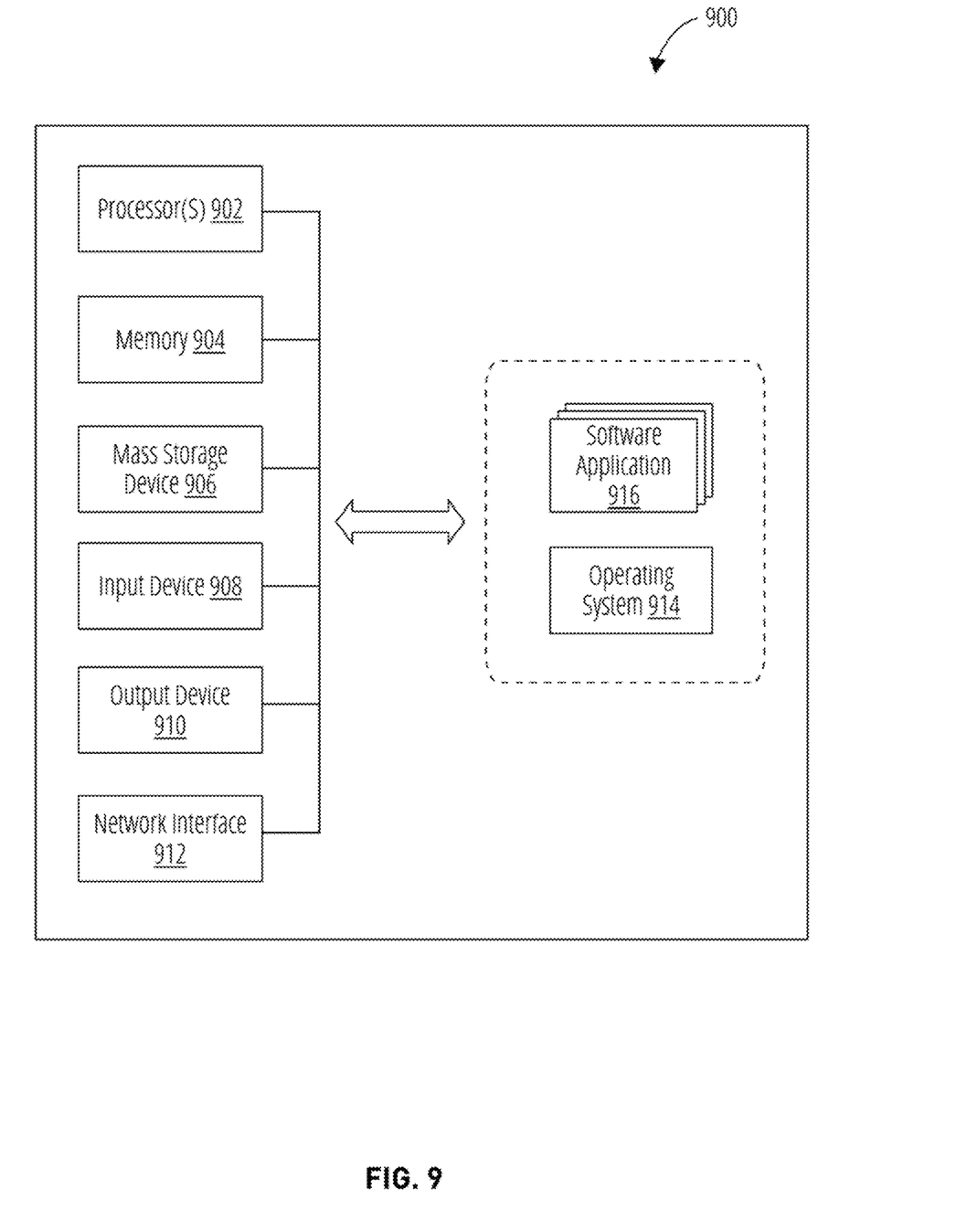
FIG. 9 is a high-level block diagram illustrating an example computer system, within which a set of instructions for causing the machine to perform any one or more of the methodologies discussed herein can be executed.

FIG. 9 is a high-level block diagram illustrating an example computer system 900, within which a set of instructions for causing the machine to perform any one or more of the methodologies discussed herein can be executed. The computer system 900 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 900 is an example of computing device 102 shown in FIG. 1. Notably, FIG. 9 illustrates just one example of the computer system 900 and, in some embodiments, the computer system 900 may have fewer elements/modules than shown in FIG. 9 or more elements/modules than shown in FIG. 9.

The computer system 900 may include one or more processor(s) 902, a memory 904, one or more mass storage devices 906, one or more input devices 908, one or more output devices 910, and a network interface 912. The processor(s) 902 are, in some examples, configured to implement functionality and/or process instructions for execution within the computer system 900. For example, the processor(s) 902 may process instructions stored in the memory 904 and/or instructions stored on the mass storage devices 906. Such instructions may include components of an operating system 914 or software applications 916. The computer system 900 may also include one or more additional components not shown in FIG. 9, such as a body, a power supply, a power supply, a global positioning system (GPS) receiver, and so forth.

The memory 904, according to one example, is configured to store information within the computer system 900 during operation. The memory 904, in some example embodiments, may refer to a non-transitory computer-readable storage medium or a computer-readable storage device. In some examples, the memory 904 is a temporary memory, meaning that a primary purpose of the memory 904 may not be long-term storage. The memory 904 may also refer to a volatile memory, meaning that the memory 904 does not maintain stored contents when the memory 904 is not receiving power. Examples of volatile memories include random access memories (RAM), dynamic random access memories (DRAM), static random access memories (SRAM), and other forms of volatile memories known in the art. In some examples, the memory 904 is used to store program instructions for execution by the processor(s) 902. The memory 904, in one example, is used by software (e.g., the operating system 914 or the software applications 916). Generally, the software applications 916 refer to software applications suitable for implementing at least some operations of the methods for AI-driven smooth video-to-video generation as described herein.

The mass storage devices 906 may include one or more transitory or non-transitory computer-readable storage media and/or computer-readable storage devices. In some embodiments, the mass storage devices 906 may be configured to store greater amounts of information than the memory 904. The mass storage devices 906 may further be configured for long-term storage of information. In some examples, the mass storage devices 906 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 908, in some examples, may be configured to receive input from a user through tactile, audio, video, or biometric channels. Examples of the input devices 908 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 900, or components thereof.

The output devices 910, in some examples, may be configured to provide output to a user through visual or auditory channels. The output devices 910 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 910 may also include a touchscreen, a presence-sensitive display, or other input/output capable displays known in the art.

The network interface 912 of the computer system 900, in some example embodiments, can be utilized to communicate with external devices via one or more data networks such as one or more wired, wireless, or optical networks including, for example, the Internet, intranet, LAN, WAN, cellular phone networks, Bluetooth radio, an IEEE 902.11-based radio frequency network, and Wi-Fi Networks®, among others. The network interface 912 may be a network interface card, such as an Ethernet card, an optical transceiver, a radio frequency transceiver, or any other type of device that can send and receive information.

The operating system 914 may control one or more functionalities of the computer system 900 and/or components thereof. For example, the operating system 914 may interact with the software applications 916 and may facilitate one or more interactions between the software applications 916 and components of the computer system 900. As shown in FIG. 9, the operating system 914 may interact with or be otherwise coupled to the software applications 916 and components thereof. In some embodiments, the software applications 916 may be included in the operating system 914. In these and other examples, virtual modules, firmware, or software may be part of the software applications 916.

Thus, systems and methods for AI-driven smooth video-to-video generation have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
receiving a first video including first frames;
acquiring a text including at least one instruction for transforming the first video;
encoding the text into text embeddings corresponding to the first frames;
encoding the first frames into image latents;
randomly generating initial noise vectors for the image latents;
adding the initial noise vectors to the image latents to obtain noisy image latents;
providing the text to a pretrained motion model to generate animation parameters corresponding to the first frames;
(a) providing the noisy image latents, the text embeddings, and the animation parameters to a first neural network to generate second noise vectors for the image latents;
(b) removing the second noise vectors from the noisy image latents to obtain denoised image latents;
wherein the operations (a) and (b) are repeated a predetermined number of times until the denoised image latents converge to further image latents associated with a true data distribution for latents corresponding to images;
decoding, using a second neural network, the denoised image latents into second frames; and
generating, based on the second frames, a second video, the second video being the first video transformed according to the at least one instruction.

2. The method of claim 1, wherein the animation parameters are used to modify intermediate features generated by the first neural network during the generation of the second noise vectors.

3. The method of claim 1, wherein the animation parameters include information concerning positions of an object across the first frames.

4. The method of claim 1, wherein the animation parameters include information concerning changing a pose of an object across the first frames.

5. The method of claim 1, wherein the animation parameters include information concerning an action of a character across the first frames.

6. The method of claim 1, wherein the animation parameters ensure that a difference in positions of an object in adjacent second frames is less than a predetermined threshold.

7. The method of claim 1, wherein the animation parameters ensure that an action associated with at least one character does not change across the second frames.

8. The method of claim 7, wherein the action includes one or more of the following: running, jumping, dancing, and playing a musical instrument.

9. The method of claim 1, wherein the first neural network includes a U-net architecture.

10. A computing device comprising:
a processor; and
a memory storing instructions that, when executed by the processor, configure the computing device to:
receive a first video including first frames;
acquire a text including at least one instruction for transforming the first video;
encode the text into text embeddings corresponding to the first frames;
encode the first frames into image latents;
randomly generate initial noise vectors for the image latents;
add the initial noise vectors to the image latents to obtain noisy image latents;
provide the text to a pretrained motion model to generate animation parameters corresponding to the first frames;
(a) provide the noisy image latents, the text embeddings, and the animation parameters, to a first neural network to generate second noise vectors for the image latents;
(b) remove the second noise vectors from the noisy image latents to obtain denoised image latents;
wherein the operations (a) and (b) are repeated a predetermined number of times until the denoised image latents converge to further image latents associated with a true data distribution for latents corresponding to images;
decode, using a second neural network, the denoised image latents into second frames; and
generate, based on the second frames, a second video, the second video being the first video transformed according to the at least one instruction.

11. The computing device of claim 10, wherein the animation parameters are used to modify intermediate features generated by the first neural network during the generation of the second noise vectors.

12. The computing device of claim 10, wherein the animation parameters include information concerning positions of an object across the first frames.

13. The computing device of claim 10, wherein the animation parameters include information concerning changing a pose of an object across the first frames.

14. The computing device of claim 10, wherein the animation parameters include information concerning an action of a character across the first frames.

15. The computing device of claim 10, wherein the animation parameters ensure that a difference in positions of an object in adjacent second frames is less than a predetermined threshold.

16. The computing device of claim 10, wherein the animation parameters ensure that an action associated with at least one character does not change across the second frames.

17. The computing device of claim 16, wherein the action includes one or more of the following: running, jumping, dancing, and playing a musical instrument.

18. A non-transitory computer-readable storage medium, the computer-readable storage medium including instructions that, when executed by a computing device, cause the computing device to:
receive a first video including first frames;
acquire a text including at least one instruction for transforming the first video;
encode the text into text embeddings corresponding to the first frames;
encode the first frames into image latents;

randomly generate initial noise vectors for the image latents;
add the initial noise vectors to the image latents to obtain noisy image latents;
provide the text to a pretrained motion model to generate animation parameters corresponding to the first frames;
(a) provide the noisy image latents, the text embeddings, and the animation parameters, to a first neural network to generate second noise vectors for the image latents;
(b) remove the second noise vectors from the noisy image latents to obtain denoised image latents;
wherein the operations (a) and (b) are repeated a predetermined number of times until the denoised image latents converge to further image latents associated with a true data distribution for latents corresponding to images;
decode, using a second neural network, the denoised image latents into second frames; and
generate, based on the second frames, a second video, the second video being the first video transformed according to the at least one instruction.

* * * * *